(12) United States Patent
Van Casteren et al.

(10) Patent No.: US 11,098,223 B2
(45) Date of Patent: *Aug. 24, 2021

(54) AQUEOUS COATING COMPOSITION

(71) Applicant: DSM IP ASSETS B.V., Heerlen (NL)

(72) Inventors: Ilse Van Casteren, Echt (NL); Ronald Tennebroek, Echt (NL); Gerardus Cornelis Overbeek, Echt (NL); Jourraine Celestijn, Echt (NL)

(73) Assignee: COVESTRO (NETHERLANDS) B.V., Nieuwegein (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/483,155

(22) PCT Filed: Feb. 7, 2018

(86) PCT No.: PCT/EP2018/053065
§ 371 (c)(1),
(2) Date: Aug. 2, 2019

(87) PCT Pub. No.: WO2018/146142
PCT Pub. Date: Aug. 16, 2018

(65) Prior Publication Data
US 2020/0239731 A1   Jul. 30, 2020

(30) Foreign Application Priority Data

Feb. 8, 2017  (EP) .................. 17155247
Feb. 8, 2017  (EP) .................. 17155248
Feb. 8, 2017  (EP) .................. 17155251
Feb. 8, 2017  (EP) .................. 17155252

(51) Int. Cl.
| | |
|---|---|
| *C08G 18/67* | (2006.01) |
| *C09D 175/16* | (2006.01) |
| *C09D 175/04* | (2006.01) |
| *C08G 18/08* | (2006.01) |
| *C08G 18/10* | (2006.01) |
| *C08G 18/32* | (2006.01) |
| *C08G 18/70* | (2006.01) |
| *C08G 18/72* | (2006.01) |
| *C08G 18/75* | (2006.01) |
| *C08G 18/76* | (2006.01) |
| *C08K 5/3415* | (2006.01) |
| *C08K 5/57* | (2006.01) |
| *C08L 75/04* | (2006.01) |
| *C08G 18/34* | (2006.01) |
| *C08G 18/73* | (2006.01) |
| *C09D 15/00* | (2006.01) |

(Continued)

(52) U.S. Cl.
CPC ....... *C09D 175/04* (2013.01); *C08G 18/0823* (2013.01); *C08G 18/10* (2013.01); *C08G 18/3228* (2013.01); *C08G 18/34* (2013.01); *C08G 18/672* (2013.01); *C08G 18/706* (2013.01); *C08G 18/722* (2013.01); *C08G 18/73* (2013.01); *C08G 18/755* (2013.01); *C08G 18/758* (2013.01); *C08G 18/7671* (2013.01); *C08K 5/17* (2013.01); *C08K 5/3415* (2013.01); *C08K 5/57* (2013.01); *C08L 75/04* (2013.01); *C08L 75/14* (2013.01); *C08L 75/16* (2013.01); *C09D 15/00* (2013.01); *C09D 175/14* (2013.01); *C09D 175/16* (2013.01); *C08G 2150/00* (2013.01); *C08L 2201/54* (2013.01)

(58) Field of Classification Search
CPC .. C09D 175/04; C09D 175/08; C09D 175/16; C08G 18/672; C08G 18/758; C08G 18/722; C08G 18/73
See application file for complete search history.

(56) References Cited

U.S. PATENT DOCUMENTS

2005/0003102 A1*  1/2005  Lockhart ............. C08G 18/44
                                                    427/558
2012/0041145 A1*  2/2012  Sommer ............ C08G 18/672
                                                    524/839

(Continued)

FOREIGN PATENT DOCUMENTS

CN    102504527 A  *  6/2012
EP    1 591 502       11/2005

(Continued)

OTHER PUBLICATIONS

CN-102504527_Jun. 2012_English Translation.*

(Continued)

*Primary Examiner* — Michael L Leonard
(74) *Attorney, Agent, or Firm* — Nixon & Vanderhye P.C.

(57) ABSTRACT

The present invention relates to a radiation-curable aqueous coating composition comprising a polyurethane A comprising as building blocks at least: (a) a polyisocyanate(s) containing at least two cyclic groups, (b) a non-cyclic aliphatic diisocyanate(s) whereby the non-cyclic aliphatic group connecting the two isocyanate groups has from 4 to 36 carbon atoms, and (c) a component(s) containing an isocyanate-reactive group(s), whereby the summed amount of (a) and (b) is 10 to 60 wt. %, relative to the total weight amount of components used to prepare the polyurethane A; and optionally radiation-curable diluent; whereby the weight ratio between (a) and (b) is in the range from 50:50 to 99:1; and whereby the ethylenically unsaturated bond concentration of the coating composition is in the range from 0.5 to 6 milliequivalents per g of polyurethane A and radiation-curable diluent.

26 Claims, No Drawings

(51) Int. Cl.
*C08K 5/17* (2006.01)
*C08L 75/16* (2006.01)
*C09D 175/14* (2006.01)
*C08L 75/14* (2006.01)

(56) References Cited

U.S. PATENT DOCUMENTS

2012/0270990 A1* 10/2012 Van Casteren ...... C09D 175/04
524/500
2016/0319153 A1    11/2016 Tennebroek et al.
2020/0017698 A1*  1/2020 Zhou .................. C09D 175/16

FOREIGN PATENT DOCUMENTS

| JP | 2014128920 A | * | 7/2014 | ............ C08G 18/67 |
| WO | WO-2007118781 A1 | * | 10/2007 | ........... C09D 175/14 |
| WO | WO-2009147092 A1 | * | 12/2009 | ........... C09D 175/14 |

OTHER PUBLICATIONS

Structure-Property Relations in Polyurethanes. Szycher's Handbook of Polyurethanes Michael Szycher. Jul. 2012_41-85.*
JP-2014128920_Jul. 2014_English Translation.*
International Search Report for PCT/EP2018/053065, dated May 8, 2018, 3 pages.
Written Opinion of the ISA for PCT/EP2018/053065, dated May 8, 2018, 6 pages.

* cited by examiner

AQUEOUS COATING COMPOSITION

This application is the U.S. national phase of International Application No. PCT/EP2018/053065 filed 7 Feb. 2018, which designated the U.S. and claims priority to EP Patent Application No. 17155247.4 filed 8 Feb. 2017, EP Patent Application No. 17155248.2 filed 8 Feb. 2017, EP Patent Application No. 17155251.6 filed 8 Feb. 2017, and EP Patent Application No. 17155252.4 filed 8 Feb. 2017, the entire contents of each of which are hereby incorporated by reference.

The present invention relates to the field of radiation-curable aqueous polyurethane coating compositions.

Radiation-curable polyurethane dispersions (PUDs) are widely used to produce materials such as coatings, inks and/or adhesives that are cured by radiation. Such radiation cured coatings exhibit very good properties on numerous substrates like wood, plastic, concrete, metal, glass and/or textiles. The structure and functionality of the radiation-curable polyurethane dispersion is known to govern factors such as the speed of cure, the extent of crosslinking and the final properties of the coating (especially properties such as flexibility, hardness, adhesion, scratch resistance and/or chemical resistance).

US-A-20090270581 describes aqueous radiation-curable polyurethane dispersions (PUD) designed for hard coatings that are also stain and scratch resistant. The PUD is obtained from a (meth)acrylated polyurethane pre-polymer (A) made by reacting (i) a polyisocyanate, in particular H12MDI (dicyclohexylmethane diisocyanate) optionally in combination with the triisocyanate HDI isocyanurate (1,6-diisocyanatehexane isocyanurate); (ii) an optional polyol; (iii) a hydrophilic compound reactive with isocyanate (NCO) to make the pre-polymer A water dispersible; (iv) a (meth)acrylate with two groups that react with NCO; (v) a (meth)acrylate with only one group that reacts with NCO; and (B) optionally an ethylenically unsaturated compound. As explained in this patent publication, radiation-curable polyurethanes generally present a high molecular weight and contain hard urea segments that usually results in dispersions with a high minimum film formation temperature MFFT and hence require the use of coalescing aids. The MFFT is the lowest temperature at which a polymer or solid portion of an aqueous polymer dispersion (also called latex or emulsion) self-coalesces in the semi-dry state to form a continuous polymer film, which in turn acts as a binder for the rest of the solids in the paint film. At temperatures at and above the MFFT of the polymer a continuous film is formed. At temperatures below its MFFT the polymer cannot coalesce to form a continuous film and thus cannot bind together itself (or any pigments and extenders that may be present) and a "cracked, crazed or powdery" layer results. Thus the higher the MFFT, the lower the chance of unaided low temperature film formation. Hence coating compositions with a low MFFT are desirable but this often requires the use of high amounts of coalescing aids. Examples of coalescing aids for radiation curable coating compositions are organic co-solvents and radiation-curable diluents. However, high amounts of organic co-solvents are disadvantageous in view of volatile organic co-solvent (VOC) levels and possible flammability risks. High amounts of radiation-curable diluents are disadvantageous as handling of the coating composition during application of the coating composition on the substrate is more cumbersome since unreacted components are present in the coating composition, which can cause skin irritation. Furthermore, the films may remain tacky before cure and the cured coating may still contain low molecular weight non-reacted material which can migrate from the coating (so-called migratables) which is not desired in for example food contact applications and for indoor air quality (for which for example IKEA has norms for emission tests). The aqueous radiation-curable polyurethane dispersions as described in US-A-20090270581 have a low MFFT (0° C.), but the amount of radiation-curable diluent (ditrimethylolpropane tetraacrylate or dipentaerythrytol hexaacrylate) in the coating composition is high. In US-A-20090270581 DTMPA or DPHA is used to prepare the aqueous radiation-curable polyurethane dispersion. DTMPA is a mixture of ditrimethylolpropane tetraacrylate (radiation-curable diluent) and ditrimethylolpropane triacrylate (the latter compound will react with isocyanate and will become part of urethane chain). DPHA is a mixture of dipentaerythrytol hexaacrylate (radiation-curable diluent) and dipentaerythrytol hydroxyl pentaacrylate (the latter compound will react with isocyanate and will become part of urethane chain). The presence of radiation-curable diluent advantageously results in lowering of the minimum-film-forming temperature MFFT of the coating composition and thus the reactive diluent acts as a coalescent. As explained above, coating compositions with a low MFFT are desirable and coating compositions with a low amount of coalescing aid are also desirable. Thus, the lower the amount of coaleascent that is needed to lower the MFFT to the desired level, the better.

The object of the present invention is to provide radiation-curable coating compositions with high stain resistances against ammonia, water, ethanol, red wine, mustard, coffee and/or tea, while at the same time the required amount of coalescent to obtain a specific MFFT can be reduced.

The object of the present invention has been achieved by providing a radiation-curable aqueous coating composition comprising a polyurethane A obtained by the reaction of at least:
(a) a polyisocyanate(s) containing at least two cyclic groups,
(b) a non-cyclic aliphatic diisocyanate(s) whereby the non-cyclic aliphatic group connecting the two isocyanate groups contains from 4 to 36 carbon atoms, and
(c) a component(s) containing at least one isocyanate-reactive group,
whereby the summed amount of (a) and (b) is 10 to 60 wt. %, relative to the total weight amount of components used to prepare the polyurethane A; and
whereby the weight ratio between (a) and (b) is in the range from 50:50 to 99:1; and the coating composition optionally comprises radiation-curable diluent
whereby the C=C bond concentration of the coating composition is in the range from 0.5 to 6 milliequivalents per g of polyurethane A and radiation-curable diluent.

It has surprisingly been found that the MFFT of the coating composition can be reduced by using a polyurethane A as claimed compared to using a polyurethane based on polyisocyanate (a) but not diisocyanate (b) (thus whereby the weight ratio between (a) and (b) is 100:0), while in addition the stain resistances against ammonia, water, ethanol, red wine, mustard, coffee and/or tea at least remain at sufficient level.

EP-A-1591502 describes UV curable coating compositions comprising A) from 1 to 99% by weight of a specific aqueous polyurethane dispersion having a solids content of from 20 to 50% by weight, B) from 1 to 99% by weight of an aqueous polyester acrylate/urethane dispersion having a solids content from 20 to 60% by weight, C) one or more photoinitiators, and D) water or a mixture of water and solvent. The polyisocyanate used for preparing polyurethane dispersion A (component A)b)) may include any organic di- and/or polyisocyanate. The polyisocyanate used for preparing polyurethane dispersion B (component B)c)) can be any of the isocyanates described as being useful in preparing dispersion A) and may be the same or different from the isocyanate component for dispersion A). In the experimental part, the PU dispersion A) contains 4,4'-diisocyanatodicyclohexylmethane (H12MDI), and the PU dispersion B) contains isophorondiisocyanate IPDI and hexamethylenediisocyanate HDI. Radiation-curable coating compositions comprising a polyurethane comprising a polyisocyanate(s) containing at least two cyclic groups as well as a non-cyclic aliphatic diisocyanate(s) whereby the non-cyclic aliphatic group connecting the two isocyanate groups has from 4 to 36 carbon atoms are not disclosed in this patent publication.

The aqueous coating composition according to the present invention is radiation-curable. By radiation-curable is meant that radiation is required to initiate crosslinking of the coating composition. Optionally a photoinitiator (PI) may be added to the radiation-curable aqueous coating compositions of the invention to assist radiation curing, especially if curing is by UV radiation. However, if curing is to be achieved by, for example, electron beam (EB) then a PI may not be needed. Preferably, the radiation-curable aqueous coating composition of the invention comprises a photoinitiator and UV-radiation is applied to obtain a cured coating. Thus the aqueous coating composition is preferably UV radiation-curable.

The coating composition according to the invention contains ethylenically unsaturated (C=C) bond functionality which under the influence of irradiation (optionally in combination with the presence of a (photo)initiator) can undergo crosslinking by free radical polymerisation. It is especially preferred that this irradiation is UV irradiation.

The ethylenically unsaturated bond functionality concentration (also referred to as the C=C bond concentration) of the coating composition of the present invention is in the range from 0.5 to 6 meq per g of the summed weight amount of polyurethane A and radiation-curable diluent present in the coating composition of the invention, preferably in the range from 0.8 to 5, more preferably from 1 to 5, more preferably from 1 to 4.5, even more preferably from 1.5 to 4.5 meq per g of polyurethane A and radiation-curable diluent. The radiation-curable C=C bonds are generally chosen from (meth)acryloyl groups and allylic groups, preferably (meth)acryloyl groups, most preferably acryloyl groups. As used herein, the amount of C=C bonds present in the coating composition is determined by adding up all radiation-curable C=C functionality from the components used to prepare the coating composition. Hence, the amount of C=C bonds present in the coating composition represents the radiation-curable C=C bonds present in the polyurethane A and radiation-curable diluent.

Methods for preparing polyurethanes are known in the art and are described in for example the Polyurethane Handbook $2^{nd}$ Edition, a Carl Hanser publication, 1994, by G. Oertel. The polyurethane A present in the radiation-curable aqueous coating composition may be prepared in a conventional manner by reacting at least (a), (b) and (c) by methods well known in the prior art. Usually an isocyanate-terminated polyurethane pre-polymer (I) is first formed by the reaction of components (a), (b) and (c) which is then preferably chain extended with an active hydrogen containing compound (II).

Component (a)

Component (a) is a polyisocyanate(s) containing at least two cyclic groups. Cyclic is defined here as a closed ring of carbon atoms, either aromatic or aliphatic. Preferably component (a) is a diisocyanate(s). Component (a) is preferably a polyisocyanate(s) containing at least two cycloaliphatic groups, a polyisocyanate(s) containing at least two aromatic groups, a polyisocyanate(s) containing at least one cycloaliphatic group and at least one aromatic group, and any mixture thereof. More preferably, component (a) is a polyisocyanate(s) containing at least two cycloaliphatic groups.

The polyisocyanate(s) containing at least two aromatic groups is preferably a polyisocyanate(s) containing at least two aromatic C6 groups and even more preferably contains two aromatic C6 groups. Non-limiting examples of component (a) containing at least two aromatic groups are methylene bis(phenyl isocyanate) (all isomers) and 3,3'-dimethyl-4,4'-biphenylene diisocyanate (CAS number 91-97-4). More preferably, the polyisocyanate(s) containing at least two aromatic groups is methylene bis(phenyl isocyanate) (all isomers). Even more preferably, the polyisocyanate(s) containing at least two aromatic groups is a mixture of 4,4'-methylene bis(phenyl isocyanate) and 2,4'-methylene bis(phenyl isocyanate), More preferably, component (a) is a polyisocyanate(s) containing at least two cycloaliphatic groups and even more preferably containing two cycloaliphatic groups. Even more preferably, component (a) is a polyisocyanate(s) containing at least two cyclohexane groups and even more preferably containing two cyclohexane groups. Preferred examples of a polyisocyanate(s) containing at least two cyclohexane groups is dicyclohexylmethane diisocyanate (all isomers). Even more preferably, component (a) is H12MDI (CAS number 5124-30-1).

Component (b)

Component (b) is a non-cyclic aliphatic diisocyanate(s) whereby the non-cyclic aliphatic group connecting the two isocyanate groups contains from 4 to 36 carbon atoms. Non-cyclic aliphatic diisocyanate(s) are those which comprise exclusively linear or branched aliphatic chains. As used herein, a non-cyclic aliphatic Cx-Cy diisocyanate means a diisocyanate whereby the two isocyanate groups are connected via a non-cyclic aliphatic group containing from x to y carbon atoms.

Preferably, component (b) is a non-cyclic aliphatic C4-C18 diisocyanate(s), more preferably a non-cyclic aliphatic C4-C12 diisocyanate(s), more preferably a non-cyclic aliphatic C4-C9 diisocyanate(s), even more preferably a non-cyclic aliphatic C4-C8 diisocyanate(s) and even more preferably a non-cyclic aliphatic C4-C6 diisocyanate(s). Non-limiting examples of component (b) are 1,4-butanediisocyanate (CAS number 4538-37-8), 1,6-hexanediisocyanate (CAS number 822-06-0), 1,8-octanediisocyanate (CAS number 10124-86-4), mixture of 2,2,4-trimethyl-hexamethylenediisocyanate and 2,4,4-trimethyl-hexamethylenediisocyanate (CAS number 32052-51-0). Most preferably, component (b) is 1,6-diisocyanatohexane (also referred to as 1,6-hexanediisocyanate) (CAS number 822-06-0).

The summed amount of (a) and (b) relative to the total weight amount of components used to prepare the polyurethane A is from 10 to 60 wt. %, more preferably from 20 to 55 wt. % and even more preferably from 25 to 50 wt. %. For the sake of reduced cost and providing a range of coating properties, the polyisocyanates (a) and (b) may be combined with one or more different polyisocyanates selected from more conventional types used for coating compositions. The polyisocyanates (a) and (b) preferably constitutes as least 70 wt. % of the total weight amount of the polyisocyanates used to prepare the polyurethane A, preferably at least 90 wt. % and most preferably 100 wt. %.

The weight ratio of (a) to (b) is in the range from 50:50 to 99:1, preferably from 60:40 to 95:5, more preferably from to 65:35 to 90:10 and even more preferably in the range from to 75:25 to 90:10.

Component (c)

Component (c) is a component(s) containing at least one isocyanate-reactive group(s), also referred to as isocyanate-reactive component(s) (c). A preferred isocyanate-reactive group is a hydroxyl group.

Component (c) preferably includes an isocyanate-reactive component(s) containing ionic and/or potentially ionic water-dispersing groups (component (c)(i)). The amount of isocyanate-reactive component(s) containing ionic or potentially ionic water-dispersing groups relative to the total weight amount of components used to prepare the polyurethane A is usually from 1 to 15 wt. %, preferably from 3 to 12 wt. % and even more preferably from 4 to 10 wt. %. As used herein, potentially anionic dispersing group means a group, which under the conditions of the polyurethane preparation reaction can be converted into an anionic group by salt formation (i.e. deprotonating the group by a base). Preferred ionic water-dispersing groups are anionic water-dispersing groups. Preferred anionic water-dispersing groups are carboxylic, phosphoric and/or sulphonic acid groups. Examples of such components (c) include carboxyl containing diols, for example dihydroxy alkanoic acids such as 2,2-dimethylol propionic acid (DMPA) or 2,2-dimethylolbutanoic acid (DMBA). Alternatively sulphonic acid groups may be used as potentially anionic water-dispersing groups. The anionic water-dispersing groups are preferably fully or partially in the form of a salt. Conversion to the salt form is optionally effected by neutralisation of the polyurethane pre-polymer with a base, preferably during the preparation of a polyurethane pre-polymer and/or during the preparation of the aqueous composition of the present invention. If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4(OH)$, can also be used. Generally a base is used as neutralizing agent which gives counter ions that may be desired for the composition. For example, preferred counter ions include $Li^+$, $Na^+$, $K^+$, $NH_4^+$ and substituted ammonium salts. Cationic water dispersible groups can also be used, but are less preferred. Examples include pyridine groups, imidazole groups and/or quaternary ammonium groups which may be neutralised or permanently ionised (for example with dimethylsulphate). A very suitable isocyanate-reactive component containing ionic or potentially ionic water-dispersing groups is dimethylol propionic acid (DMPA). The neutralising agent is preferably used in such an amount that the molar ratio of the ionic and potentially ionic water dispersing groups to the neutralizing groups of the neutralising agent are in the range of from 0.3 to 1.5, more preferably from 0.4 to 1.2 and even more preferably from 0.5 to 0.98. In preferred radiation-curable aqueous coating composition of the invention the neutralizing agent is a metal salt and/or ammonia.

In a preferred embodiment of the invention, the ethylenically unsaturated bond concentration (the C═C bond concentration) of the coating composition is at least partly introduced in the coating composition by the presence of (meth)acryloyl groups in the polyurethane A (compared to introducing the C═C bond concentration of the coating composition solely by the presence of radiation-curable diluent in the coating composition). In a more preferred embodiment of the invention, the ethylenically unsaturated bond concentration of the coating composition is introduced in the coating composition by the presence of (meth)acryloyl groups in the polyurethane A. Incorporation of at least a part of the ethylenically unsaturated bond functionality concentration of the coating composition in the polyurethane A is predominantly beneficial for drying, labelling and migratables. In these preferred embodiments, component(s) containing at least one isocyanate-reactive group and at least one (meth)acryloyl group per molecule (component (c)(ii) is used to prepare the polyurethane A, resulting in polyurethane A containing (meth)acryloyl groups. Acrylates are particularly preferred.

Preferred components (c)(ii) are for example those obtained from the reaction of diglycidyl compounds with (meth)acrylic acid. Acrylates are particularly preferred. Aliphatic diglycidyl compounds derived from alpha, omega diols having 4 to 12 carbon atoms or from polyoxyalkylenediols, especially polyethylene glycol, polypropylene glycol or mixtures thereof that contain oxyalkylene groups, can be used. Preference is given, for example, to 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, hydrogenated bisphenol A diglycidyl ether and hydrogenated bisphenol F diglycidyl ether and their ethoxylated and/or propoxylated equivalents. It is also possible to employ diglycidyl esters, such as diglycidyl hexahydrophthalate. Aromatic diglycidyl compounds derived from bisphenol A and bisphenol F are preferred. Particularly preferred are bisphenol A diglycidyl ether, bisphenol F diglycidyl ether and their ethoxylated and/or propoxylated equivalents. It is also possible to employ diglycidyl esters, such as diglycidyl phthalate, N,N-diglycidyl aniline, N,N-diglycidyl-4-glycidyloxyaniline. Especially preferred is the diacrylate ester of bisphenol A diglycidylether. Components (c)(ii) obtained from partial esterification of aliphatic or aromatic polyhydric polyols with (meth)acrylic acid and having a hydroxyl functionality in the molecule, can also be used. In this context, it is also possible to use the reaction products of such polyols with ethylene oxide and/or propylene oxide or mixtures thereof, or reaction products of such polyols with lactones, which add to these polyols in a ring-opening reaction. Examples of suitable lactones are gamma-butyrolactone and, in particular delta-valerolactone and e-caprolactone. Preferred are those (alkoxylated) polyols having not more than two alkoxy groups per hydroxyl functionality and e-caprolactone-modified polyols. It is known to those skilled in the art that the (meth)acrylation of polyols such as glycerol, trimethylolpropane, pentaerythritol, di-trimethylolpropane or di-pentaerythritol proceeds to a mixture of mono-, di-, tri-, tetra-, penta- and hexa(meth)acrylate and that a possible way to characterize the mixture is by measuring its hydroxyl value. Examples are glycerol mono-(meth)acrylate, trimethylolpropane mono-(meth)acrylate, pentaerythritol di-(meth)acrylate, di-trimethylolpropane di-(meth)acrylate, di-pentaerythritol tetra-(meth)acrylate and their polyethoxylated and/or polypropoxylated equivalents. Other preferred components (c)(ii) are hydroxyethyl (meth)acrylate, hydroxypropyl (meth)acrylate, hydroxybutyl (meth)acrylate, glycerol diacrylate, trimethylolpropane diacrylate, pentaerythritol triacrylate, ditrimethylolpropane triacrylate, di pentaerythritol pentaacrylate and their (poly)ethoxylated and/or (poly)propoxylated equivalents, and polyester acrylates with average OH functionality of from 0.5 to 2.7, more preferably from 0.7 to 2.

In case component(s) containing at least one isocyanate-reactive group and at least one (meth)acryloyl group per molecule (component (c)(ii) is used to prepare the polyurethane A, the amount of isocyanate-reactive component(s) containing at least one (meth)acryloyl group per molecule (component (c)(ii)) relative to the total weight amount of components used to prepare the polyurethane A is usually from 5 to 70 wt. %, preferably from 10 to 50 wt. % and even more preferably from 15 to 35 wt. %.

Component (c) optionally further includes at least one other isocyanate-reactive component (c)(iii) than component (c)(i) and component (c)(ii). Isocyanate-reactive component (c)(iii) may be selected from any of the chemical classes of mono-ols and/or polyols that can be used in polyurethane synthesis and is different than any other component (c). Component (c)(iii) preferably has a number average molecular weight of from 500 to 6000. As used herein, the number average molecular weight of a hydroxyl group containing component is determined by multiplying the equivalent weight of the component with the OH functionality of the component (the OH functionality of the polyol is given by the supplier; in case the polyol is a diol, the OH functionality is 2). The equivalent weight of the component is calculated by dividing 56100 by the OH number of the component. The OH number of the component is measured by titration a known mass of component according to ASTM D4274 and is expressed as mg KOH/g.

In particular the isocyanate-reactive component (c)(iii) may be a polyester polyol, a polyesteramide polyol, a polyether polyol, a polythioether polyol, a polycarbonate polyol, a polyacetal polyol, a polyvinyl polyol and/or a polysiloxane polyol. Preferably, the isocyanate-reactive component (c)(iii) is selected from the group consisting of polyester(amide) polyols, polyether polyols, polycarbonate polyols and any mixture thereof. The amount of component (c)(iii) relative to the total weight amount of components used to prepare the polyurethane A is usually from 0 to 40 wt. %, preferably from 5 to 35 wt. % and even more preferably from 10 to 30 wt. %.

The amount of component(s) (c) relative to the total weight amount of components used to prepare the polyurethane A is preferably from 40 to 90 wt. %, more preferably from 45 to 80 wt. % and even more preferably from 50 to 75 wt. %.

The acid value of the polyurethane A in the radiation-curable aqueous coating composition is preferably in the range from 4 to 60 mg KOH/g polyurethane A, preferably 8 to 50 mg KOH/g polyurethane A, more preferably from 12 to 45 mg KOH/g polyurethane A. As used herein, the acid value of the polyurethane A is determined according to DTN-EN ISO 2114.

Radiation-Curable Diluent

The radiation-curable aqueous coating composition according to the present invention optionally contains radiation-curable diluent, i.e. multifunctional ethylenically unsaturated components which under the influence of irradiation (optionally in combination with the presence of a (photo)initiator) can undergo crosslinking by free radical polymerisation, but being unreactive towards isocyanate groups (i.e. containing no functionality which is capable to react with an isocyanate group) under the conditions of the polyurethane preparation reaction, and which are able to reduce the viscosity of the composition, for example by adding radiation-curable diluent during the synthesis of the polyurethane A and/or by adding radiation-curable diluent to the polyurethane A dispersion. The ethylenically unsaturated bond functionality of the coating composition may be at least partly introduced in the coating composition by the presence of radiation-curable diluent in the coating composition. The presence of radiation-curable diluent also advantageously results in lowering of the minimum-film-forming temperature MFFT of the coating composition and thus the reactive diluent acts as a coalescent. However, a disadvantage of the presence of reactive diluent is that handling of the coating composition during application of the coating composition on the substrate is more cumbersome since unreacted components are present in the coating composition which can cause skin-irritation. Furthermore, the cured coating may still contain low molecular weight non-reacted material which can migrate from the coating (so-called migratables) which is not desired for food contact applications and indoor air quality. It has surprisingly been found that with the composition of the present invention the minimum film formation temperature can be lowered without having to increase the amount of coalescent in the coating composition and thus also without having to increase the amount of radiation-curable diluent. It has surprisingly been found that the coating composition of the present invention can have a minimum film formation temperature of lower than 50° C., even lower than 45° C., even lower than 35° C., even lower than 25° C., even lower than 20° C. and even lower than 5° C. even when the coating composition is substantially free of radiation-curable diluent (also referred to as in the substantial absence of radiation-curable diluent). As used herein, substantially free of radiation-curable diluent means that the coating composition contains less than 40 wt. % of radiation-curable diluent, preferably less than 30 wt. % of radiation-curable diluent, more preferably less than 20 wt. % of radiation-curable diluent, more preferably less than 10 wt. % of radiation-curable diluent, more preferably less than 5 wt. % of radiation-curable diluent, more preferably less than 3 wt. % of radiation-curable diluent, more preferably less than 1 wt. % of radiation-curable diluent (relative to the total weight of the coating composition of the present invention). A minimum film formation temperature of lower than 50° C., even lower than 45° C., even lower than 35° C., even lower than 25° C. and even lower than 20° C. can be obtained even without the presence of radiation-curable diluent in the radiation-curable aqueous coating composition.

Polyhydric polyols which have been totally esterified with (meth)acrylic acid and contain substantially no residual hydroxyl functionality in the molecule are particularly preferred radiation-curable reactive diluent(s). Suitable are the esterification products of (meth)acrylic acid with tri-, tetra-, penta- and/or hexahydric polyols and mixtures thereof. Examples are trimethylolpropane tri-acrylate, glycerol tri-acrylate, pentaerythritol tetra-acrylate, di-trimethylolpropane tetra-acrylate, di-pentaerythritol hexa-acrylate and their (poly)ethoxylated and/or (poly)propoxylated equivalents, as well as mixtures thereof. It is also possible to use any compound from the category of urethane(meth)acrylates, epoxy(meth)acrylates, polyester(meth)acrylates and (meth)acrylic(meth)acrylates or mixtures thereof.

Coalescing aids or agents (also referred to as coalescents or film-forming assistants) are used in coating composition such as for example paints for optimizing the film formation process of the polymeric binder particles. The film formation process in coating compositions involves the coalescence of the polymeric particles, during and after the evaporation of the diluents (in the present invention mainly water), thereby permitting contact and fusion of adjacent polymeric dispersion particles. Coalescing agents typically reduce the minimal film formation temperature of a coating composition. Non-limited examples of coalescents are organic co-solvents or radiation-curable diluents as described above. Organic co-solvents may be added before, during or after polyurethane formation to control the viscosity. Examples of co-solvents also having the function of coalescent include water-miscible solvents such as 1-methyl-2-pyrrolidinone, glycols and glycol ethers such as butyldiglycol, dipropylene glycol methyl ether, acetone, methyl ethyl ketone and alkyl ethers of glycol acetates or mixtures thereof.

It has surprisingly been found that with the composition of the present invention the minimum film formation temperature can be lowered without having to increase the amount of coalescent in the coating composition. It has surprisingly been found that the coating composition of the present invention can have a minimum film formation temperature of lower than 50° C., even lower than 45° C., even lower than 35° C., even lower than 25° C., even lower than 20° C. and even lower than 15° C. even when the coating composition is substantially free of coalescent (also referred to as in the substantial absence of coalescent). Substantially free of coalescent means that coalescent is not intentionally added to the aqueous coating composition, however the presence of low amounts of coalescent cannot be excluded since low amounts of co-solvents may be present in additives that are added to the coating composition. As used herein, substantially free of coalescent (also referred to as in the substantial absence of coalescent) means that the coating composition contains less than 5 wt. % of coalescent, preferably less than 3 wt. % of coalescent, more preferably less than 1 wt. % of coalescent by weight of the solids content of the coating composition of the present invention. The solids content is determined by evaporation of the volatile compounds such as water and optionally solvent and volatile amines present in the aqueous coating composition. With the composition of the present invention a minimum film formation temperature of lower than 50° C., even lower than 45° C., even lower than 25° C., even lower than 20° C., can be obtained even without the presence of coalescent in the radiation-curable aqueous coating composition.

Further, a low amount of organic co-solvent is advantageous in view of volatile organic co-solvent (VOC) levels and possible flammability risks. In particular for 1-methyl-2-pyrrolidinone (NMP), legislation on the labelling of products containing NMP becomes more and more severe. Therefore, the presence of minimum amounts of NMP or the absence of NMP is desired. The amount of 1-methyl-2-pyrrolidinone in the aqueous coating composition is preferably less than 3 wt. % by weight of solids content of the coating composition, preferably less than 1 wt. %, more preferably less than 0.5 wt. % and even more preferably is 0 wt. %. Further, a low amount of radiation-curable diluent is advantageous for the reasons as explained above.

The radiation-curable aqueous coating composition of the invention preferably contains tin in amount of preferably at most 50 ppm, more preferably at most 10 ppm, even more preferably at most 5 ppm, even more preferably at most 2 ppm and even more preferably the radiation-curable aqueous coating composition of the invention does not contain tin. The aqueous coating composition of the invention preferably contains tertiary amines like for example triethylamine in amount of preferably at most 1.5 wt. % (relative to the aqueous coating composition), more preferably at most 1 wt. %, even more preferably at most 0.5 wt. %, even more preferably at most 0.1 wt. % and even more preferably the aqueous coating composition of the invention does not contain tertiary amine(s).

The radiation-curable aqueous coating composition according to the present invention may further comprise other polymeric binders than the polyurethane A, for example a polyvinyl copolymer binder. The polyurethane A is preferably present in the aqueous coating composition in an amount of from 20 to 55 wt. %, preferably in an amount of from 25 to 50 wt. % (relative to the total weight of the aqueous coating composition).

The present invention further relates to a process for preparing an aqueous coating composition as described above comprising the following steps
I. preparing an isocyanate-terminated polyurethane pre-polymer by reacting at least components (a), (b), (c):
(a) a polyisocyanate(s) containing at least two cyclic groups,
(b) a non-cyclic aliphatic diisocyanate(s) whereby the non-cyclic aliphatic group connecting the two isocyanate groups has from 4 to 36 carbon atoms, and
(c) a component(s) containing at least one isocyanate-reactive group comprising
(c) (i) isocyanate-reactive component(s) containing ionic and/or potentially ionic water-dispersing groups, and/or
(c)(ii) isocyanate-reactive component(s) containing at least one (meth)acryloyl group per molecule, and/or
(c)(iii) isocyanate-reactive component(s) not comprised by (c)(i) and (c)(ii);
whereby the summed amount of (a) and (b) is 10 to 60 wt. %, relative to the total weight amount of components used to prepare the polyurethane A; and
whereby the weight ratio between (a) and (b) is in the range from 50:50 to 99:1;
whereby diluent is added in step I;
II. either blending the isocyanate-terminated polyurethane pre-polymer with an aqueous phase comprising neutralizing agent and optionally comprising further chain extending compound or either neutralizing the isocyanate-terminated polyurethane pre-polymer by adding neutralizing agent to the isocyanate-terminated polyurethane pre-polymer and subsequently (i) adding the neutralized isocyanate-terminated polyurethane pre-polymer to water optionally comprising further chain extending compound or (ii) adding water optionally comprising further chain extending compound to the neutralized isocyanate-terminated polyurethane pre-polymer; and
whereby, at the start of the reaction to prepare the isocyanate-terminated polyurethane pre-polymer, the process comprises feeding to the reactor either (A) components (a) and (b) and at least one of the components (c)(i), (c)(ii) and (c)(iii), either (B) component (a) and at least two of the components (b), (c)(i), (c)(ii) and (c)(iii) or either (C) component (b) and at least two of the components (a), (c)(i), (c)(ii) and (c)(iii); and
whereby the preparation of the polyurethane A is effected in the presence of <3 wt. % of 1-methyl-2-pyrrolidone by weight of the polyurethane A, preferably less than 1 wt. % of 1-methyl-2-pyrrolidone, more preferably less than 0.5 wt. % of 1-methyl-2-pyrrolidone and most preferably the preparation of the polyurethane A is effected in the absence of 1-methyl-2-pyrrolidone.

In the process of the invention, component (c)(i) is preferably used to prepare the polyurethane A. Component (c)(ii) is also preferably used to prepare the polyurethane A. Component (c)(iii) is preferably also used to prepare the polyurethane A.

The process comprises feeding to the reactor, at the start of the reaction to prepare the isocyanate-terminated polyurethane pre-polymer, either (A) components (a) and (b) and at least one of the components (c)(i), (c)(ii) and (c)(iii), either (B) component (a) and at least two of the components (b), (c)(i), (c)(ii) and (c)(iii) or either (C) component (b) and at least two of the components (a), (c)(i), (c)(ii) and (c)(iii). At least a part of the amount of these components are added to the reactor at the start of the reaction or the entire amount of these components are added to the reactor at the start of the reaction. The preparation of the isocyanate-terminated polyurethane pre-polymer is usually carried out at a temperature from 30 to 130° C., preferably from 70 to 110° C. Preferably, the process comprises feeding components (a) and (b) and at least one of the components (c)(i), (c)(ii) and (c)(iii) to the reactor at the start of the reaction to prepare the isocyanate-terminated polyurethane pre-polymer. More preferably, the process comprises feeding components (a), (b),(c)(i),(c)(ii) and (c)(iii) to the reactor at the start of the reaction to prepare the isocyanate-terminated polyurethane pre-polymer.

Step I of the process of the present invention is preferably facilitated by the addition of at most 50 wt. % of diluent (relative to the total weight amount of components used to prepare the isocyanate-terminated polyurethane prepolymer) in order to reduce the viscosity of the pre-polymer. Preferably the diluent is added at the start of the reaction in step I. The diluent is preferably acetone and/or methylethylketone, more preferably the diluent is acetone which is preferably removed from the polyurethane dispersion at the end of the polyurethane dispersion preparation.

U.S. Pat. No. 6,147,155 relates to a process for preparing non-radiation curable aqueous polyurethane dispersion based on cyclic diisocyanates and non-cyclic diisocyanates, in particular H12MDI and hexamethylene diisocyanate (HDI) or isophorone diisocyanate (IPDI) and HDI are used as polyisocyanates. The teaching of U.S. Pat. No. 6,147,155 is that a multi-step process is required to prepare the aqueous polyurethane dispersion with good processing, i.e. in the first stage a cyclic diisocyanate is reacted with a compound containing one or more isocyanate-reactive groups and at least one carboxylic acid or carboxylate groups to form an intermediate product; after the preparation of this intermediate product, the remaining components (among others the non-cyclic diisocyanate) are reacted with the intermediate product to form the NCO pre-polymer. Applicant has found that the use of the coalescent 1-methyl-2-pyrrolidone (NMP) in the first stage is essential to reduce viscosity and avoid phase separation and settling in the first stage. However, legislation on the labelling of products containing NMP becomes more and more severe. Therefore, proposed changes in legislation on the labelling of products containing NMP are resulting in increased efforts to minimize and even eliminate the use of NMP. Therefore, the presence of minimum amounts of NMP or the absence of NMP is highly desirable. Further, U.S. Pat. No. 6,147,155 does not teach that the MFFT of the aqueous polyurethane coating composition can be reduced by the use of a polyisocyanate(s) containing at least two cyclic groups and a non-cyclic aliphatic C4-C36 diisocyanate(s). The presence of large amounts of the coalescent NMP present in all examples result in low MFFT's (<5° C.). Further it has been found that, compared to the use of a polyisocyanate(s) containing one cyclic groups (such as for example isophorone diisocyanate IPDI) and a non-cyclic aliphatic C4-C36 diisocyanate(s), the use of a polyisocyanate(s) containing at least two cyclic groups in combination with a non-cyclic aliphatic C4-C36 diisocyanate(s) results in that mechanical properties like hardness and blocking, and stain resistance are better while the increase of the MFFT (due to the use of a polyisocyanate(s) containing at least two cyclic groups) is surprisingly reduced and thus coalescent demand is surprisingly reduced.

It has surprisingly been found that, contrary to the process as described in U.S. Pat. No. 6,147,155, it is possible to add component (a) and component (b) both at the start of the reaction to prepare the isocyanate-terminated polyurethane pre-polymer under the condition that the preparation of the polyurethane A and hence also the preparation of the isocyanate terminated polyurethane pre-polymer is effected in the presence of <3 wt. % of 1-methyl-2-pyrrolidone by weight of the polyurethane A, preferably in the presence of less than 1 wt. % of 1-methyl-2-pyrrolidone, more preferably in the presence of less than 0.5 wt. % of 1-methyl-2-pyrrolidone and preferably the preparation of the polyurethane A is effected in the absence of 1-methyl-2-pyrrolidone. Hence, in the process of the invention, the isocyanate-terminated polyurethane pre-polymer can be prepared in a one-step process. It has furthermore surprisingly found that, contrary to the process described in U.S. Pat. No. 6,147,155, the well-known chain extending compounds containing at least two primary amino groups, like for example hydrazine and ethylene diamine, are suitable for chain extending the isocyanate-terminated polyurethane pre-polymer in the process of the invention. In the process as described in U.S. Pat. No. 6,147,155, it is necessary to use chain extenders that do not contain more than one unblocked primary or secondary amino group in order to overcome the difficulty of rapidly reaction of the chain extender with any unreacted, monomeric non-cyclic diisocyanates present in the isocyanate terminated polyurethane prepolymer. In the process of the present invention, the use of chain extenders that do not contain more than one unblocked primary or secondary amino group is not required, although they can also be applied as chain extenders. Further, the use of compounds containing unblocked primary and/or unblocked secondary amino groups is preferred in view of reduced VOC content of the coating composition.

Preferably the isocyanate-terminated polyurethane pre-polymer is chain extended with an active hydrogen-containing chain extending compound(s) other than water. Active hydrogen-containing chain extending compounds, which may be reacted with the isocyanate-terminated pre-polymer include amino-alcohols, primary or secondary diamines or polyamines (including compounds containing a primary amino group and a secondary amino group), hydrazine and substituted hydrazines. Examples of such chain extending compounds useful herein include 2-(methylamino)ethylamine, aminoethyl ethanolamine, aminoethylpiperazine, diethylene triamine, and alkylene diamines such as ethylene diamine, and cyclic amines such as isophorone diamine. Also compounds such as hydrazine, azines such as acetone azine, substituted hydrazines such as, for example, dimethyl hydrazine, 1,6-hexamethylene-bis-hydrazine, carbodihydrazine, hydrazides of dicarboxylic acids, adipic acid dihydrazide, oxalic acid dihydrazide, isophthalic acid dihydrazide, and sulphonic acids such as amino sulphonates. Hydrazides made by reacting lactones with hydrazine, bis-semi-carbazide, and bis-hydrazide carbonic esters of glycols may be useful. Preferred chain extending compounds are selected from the group consisting of hydrazine, a primary diamine (s), a secondary diamine(s), a compound(s) containing a primary amino group and a secondary amino group, and any mixture thereof.

Preferably the molar ratio between the active hydrogen present in the active-hydrogen chain extending compound other than water to isocyanate (NCO) groups present in the isocyanate-terminated polyurethane pre-polymer is in the range of from 0.5:1 to 1.2:1, more preferably 0.6:1 to 1.1:1, especially 0.75:1 to 1.02:1 and most preferably 0.78:1 to 0.98:1. Preferably, either the isocyanate-terminated polyurethane pre-polymer is blended with an aqueous phase comprising neutralizing agent and the chain extending compound or either the neutralized isocyanate-terminated polyurethane pre-polymer is added to water comprising the chain extending compound or either (and more preferably) the neutralized isocyanate terminated polyurethane is blended with an aqueous phase and after blending the chain extending compound is added.

In a preferred embodiment of the process of the present invention, neutralizing and chain extending the isocyanate-terminated polyurethane prepolymer is effected by neutralizing the isocyanate-terminated polyurethane prepolymer, subsequently dispersing the neutralized isocyanate-terminated polyurethane prepolymer in water to obtain a dispersion and then adding chain extending compound (preferably water diluted chain extending compound) to said dispersion.

The present invention further relates to a method for coating a substrate selected from the group consisting of wood, metal, plastic, linoleum, concrete, glass, packaging film and any combination thereof; where the method comprises
(i) applying an aqueous coating composition according to the invention or obtained with the process according to the invention to the substrate; and
(ii) physically drying (by evaporation of volatiles) and curing by radiation (preferably UV radiation) of the aqueous coating composition to obtain a coating.

The present invention further relates to a substrate having a coating obtained by (i) applying an aqueous coating composition according to the invention or obtained with the process according to the invention to a substrate and (ii) physically drying and curing by radiation (preferably UV-radiation) of the aqueous coating composition to obtain a coating. The substrate is preferably selected from the group consisting of wood, metal, plastic, linoleum, concrete, glass, packaging film and any combination thereof. More preferably, the substrate is selected from the group consisting of wood, PVC, linoleum and any combination thereof.

The composition according to the invention can also be used for use in digital printing ink formulations, more preferred ink-jet printing formulations and overprint varnishes. Digital printing is a method of printing from a digital-based image directly to a variety of media. For ink applications, the composition is mixed with a pigment (possibly a self-dispersible pigment or a pigment in combination with a suitable dispersant) in an aqueous media (optionally including water soluble organics like glycols, glycol ethers, glycerin) to form an ink. The ink will be called a formulation and can include other additives such as humectants, other binders, viscosity modifiers, surface active agents, corrosion inhibitors, etc.

The present invention is now illustrated by reference to the following examples. Unless otherwise specified, all parts, percentages and ratios are on a weight basis.

Components and Abbreviations Used

H12MDI=Dicyclohexylmethane-4,4'-diisocyanate available from Covestro
HDI=Hexamethylenediisocyanate available from Covestro
IPDI=lsophorondiisocyanate available from Covestro
DMPA=Dimethylolpropionic acid available from Perstorp polyols
Dabco T-9=catalyst Tin bis(2-ethylhexanoate) available from Air Products
BismuthNeodecanoate=catalyst bismuth neodecanoate from TIB chemicals AG
pTHF 1000=Polytetramethylene ether glycol, OH-number=112.5 mg KOH/g available from BASF
Priplast 3192=Polyester diol, OH-number=56.0 mg KOH/g available from Croda Coatings & Polymers
Agisyn1010=100% bisphenolA epoxyacrylate available from DSM AGI
Agisyn 2884=Mixture of pentaerytritol triacrylate and pentaerytritoltetraacrylate available from AGI
Agisyn 2811=Trimethylolpropanetriacrylate available from DSM AGI
BHT=Butylated hydroxyl toluene (inhibitor) available from Merisol
TEA=Triethylamine available from Arkema
EDA=Ethylene diamine available from Caldic
Hydrazine=16 wt % solution of hydrazine in water available from Fluka
Dowanol DPM=Di(propylene glycol) monomethyl ether (DDPM) available from Dow Benelux
Agisyn 2836=Ethoxylated(3) trimethylolpropane triacrylate available from DSM AGI
BYK346=Silicone surfactant for aqueous coatings to improve substrate wetting available from BYK
TMDI=Mixture of 2,2,4- and 2,4,4-trimethyl-hexamethyl-enediisocyanate from Evonik, CAS number 32052-51-0
Laromer LR-8765=Butanediol diglycidyletherdiacrylate from BASF
Desmophen C 2200=Polycarbonate diol from Covestro
KOH 15%=Potassium hydroxide, 15% solution in water from Brenntag
ADH=Adipic dihydrazide from ESIM Chemicals
PEC205=Ketone-functional polyester polyol, available from DSM, with a hydroxyl value of 80 mg KOH/g and an acid value of <1 mg KOH/g. The ketone functionality is 1.7 milliequivalents carbonyl groups per g polyol.
Irg 500=Irgacure 500 photoinitiator available from BASF
Acetone=Acetone available from Brenntag

EXAMPLES

The following examples were prepared and coatings were obtained and tested. The compositions of the examples and results are as shown in the tables below.
Minimum Film Formation Temperature MFFT The MFFT is the lowest temperature at which a polymer or solid portion of an aqueous polymer dispersion (also called latex or emulsion) self-coalesces in the semi-dry state to form a continuous polymer film, which in turn acts as a binder for the rest of the solids in the paint film. At temperatures at and above the MFFT of the polymer a continuous film is formed. At temperatures below its MFFT the polymer cannot coalesce to form a continuous film and thus cannot bind together itself (or any pigments and extenders that may be present) and a "cracked, crazed or powdery" layer results. MFFT is measured on a Rhopoint MFFT-90 Minimum Film Forming Temperature Instrument using a wet film thickness of 90 μm.

Viscosity was determined with a Brookfield DV-I viscometer (spindle S61, 60 rpm, 23° C.)

Particle Size

The particle size was determined by photon correlation spectroscopy using a Malvern Zetasizer Nano zs. Samples are diluted until a concentration of approximately 0.1 g disp/liter.

Solids Content

The solids content of the dispersion was determined on a Mettler Toledo HB43-S Compact Halogen Moisture Analyzer. At the start of the measurement the Moisture Analyzer determines the weight of the sample, the sample is then heated to 130° C. by the integral halogen heating module and the volatile compounds vaporizes. During the drying process the instrument continually measures the weight of the sample. Once drying has been completed, the solids content of the sample is displayed as the final result.

Preparation of Radiation Curable Polyurethane Dispersion

Example 1

A 2000 cm$^3$ flask equipped with a thermometer and overhead stirrer was charged with components DMPA (20.3 g), Priplast3192 (156.3 g), Agisyn1010 (112.5 g), H12MDI (128.7 g), HDI (32.2 g), acetone (250.0 g) and BHT (0.8 g). The reaction was heated to 50° C. and 0.16 g of Dabco T-9 was added. The reaction was kept at 60° C. until full conversion. The course of the reaction was monitored by NCO titration. When the NCO content of the resultant isocyanate-terminated prepolymer was 4.0% on solids (theoretically 4.2%), the prepolymer was cooled down to 35° C. and TEA was added (14.5 g). The NCO/OH molar ratio is 1.5.

A dispersion of the resultant isocyanate-terminated prepolymer was made by adding deionized water (1150 g) to the prepolymer mixture. After dispersing a mixture of EDA (10.3 g) and water (30 g) was added. Subsequently the acetone was removed from the dispersion by distillation under vacuum. The acryloyl concentration of the resulting dispersion was 1 meq/g solids.

The specifications of the resultant polyurethane dispersion are given in Table 2.

Examples 2, 4-9 and Comparative Example A and E

In Examples 2, 4-9 and Comparative Examples A-E the process described in Example 1 was repeated except that different quantities and different constituents were used such that the polyurethane prepolymer had a specific NCO/OH molar ratio (1.5) and hence the dispersability of the polyurethane prepolymer was not affected by using polyurethane prepolymer with different NCO/OH molar ratio. The amount of EDA was calculated on the experimental NCO content at the end of the prepolymer preparation and was kept constant (0.8 stoichiometric amount of EDA on NCO was added) for Examples 2, 4, 6-9 and Comparative Examples A-E. For Example 5, 0.7 stoichiometric amount of EDA on NCO was added. These quantities and components are specified below in Table 1. Unless specified otherwise, the amounts of the different components are expressed in grams. The specifications of the resulting compositions are represented in Tables 2, the film properties in Table 5.

Example 3

A 1000 cm$^3$ flask equipped with a thermometer and overhead stirrer was charged with components DMPA (20.0 g), pTHF1000 (136.6 g), H12MDI (138.8 g), HDI (24.5 g), Agisyn2884 (80.0 g), Agisyn 2811 (100 g) and BHT (0.6 g). The reaction was heated to 90° C. and 0.16 g of Dabco T-9 was added. The reaction was kept at 90° C. until full conversion. The course of the reaction was monitored by NCO titration. When the NCO content of the resultant isocyanate-terminated prepolymer was 4.23% (theoretically 5.0%), the prepolymer was cooled down to 80° C. and TEA was added (14.3 g).

A dispersion of the resultant isocyanate-terminated prepolymer was made by feeding 414 gram of the prepolymer mixture to deionized water (596 g) over the course of 45 minutes.

After dispersing a mixture of hydrazine (16% solids in water, 36.3 g) and water (20 g) was added. The acryloyl concentration of the resulting dispersion was 3.7 meq/g solids.

The specifications of the resultant polyurethane dispersion are given in Table 2.

TABLE 1

Compositions

| Compounds | Comp. Ex A | Ex. 2 | Comp. Ex B | Ex. 4 | Ex. 5 | Ex. 6 | Ex. 7 | Ex. 8 |
|---|---|---|---|---|---|---|---|---|
| DMPA | 20.3 | 20.3 | 20.3 | 20.3 | 20.3 | 22.5 | 22.5 | 20.3 |
| Priplast 3192 | 141.5 | — | — | — | — | — | — | — |
| pTHF1000 | — | 132.7 | 121.6 | 126.5 | 132.5 | 103.7 | — | — |
| Desmophen C2200 | — | — | — | — | — | — | 145.8 | — |
| PEC 205 | — | — | — | — | — | — | — | 143.6 |
| H12MDI | 175.8 | 156.9 | 195.7 | 162.2 | 157.0 | 179.6 | 143.8 | 147.6 |
| TMDI | — | — | — | 28.6 | — | — | — | — |
| HDI | — | 27.7 | — | — | 27.7 | 31.7 | 25.4 | 26.0 |
| AgiSyn1010 | 112.5 | 112.5 | 112.5 | 112.5 | 112.5 | — | 112.5 | 112.5 |
| Laromer LR-8765 | — | — | — | — | — | 112.5 | — | — |
| Dabco T-9 | 0.16 | 0.16 | 0.16 | 0.16 | — | 0.24 | 0.16 | 0.16 |
| Bismuth Neodecanoate | — | — | — | — | 0.24 | — | — | — |
| Acetone | 200 | 150 | 150 | 150 | 150 | 150 | 150 | 150 |
| BHT | 0.8 | 0.8 | 0.8 | 0.8 | 0.8 | 0.8 | 0.8 | 0.8 |
| NCO % prepolymer on solids | 3.6 | 4.5 | 4.1 | 5.3 | 4.7 | 5.5 | 4.1 | 4.7 |
| TEA | 14.5 | 14.5 | 14.5 | 14.5 | — | 14.4 | 14.4 | 14.5 |

TABLE 1-continued

| Compositions | | | | | | | | |
|---|---|---|---|---|---|---|---|---|
| KOH (15% in water) | — | — | — | — | 56.5 | — | — | — |
| Water | 885 | 885 | 885 | 885 | 902 | 927 | 902 | 956 |
| EDA | 9.3 | 11.6 | 10.4 | 13.6 | 10.6 | 14.1 | 10.6 | 12.1 |
| ADH | — | — | — | — | — | — | — | 15.5 |

| Compounds | Ex 9 | Comp. Ex. C | Comp. Ex D | Comp. Ex E |
|---|---|---|---|---|
| DMPA | 20.3 | 20.3 | 20.3 | 20.3 |
| Priplast 3192 | 106.8 | 94.4 | 119.3 | 125.9 |
| H12MDI | 152.1 | 191.3 | — | — |
| IPDI | — | — | 166.5 | 135.9 |
| HDI | 26.9 | — | — | 24.0 |
| AgiSyn1010 | 144.0 | 144.0 | 144.0 | 144.0 |
| Bismuth Neodecanoate | 0.24 | 0.24 | 0.24 | 0.24 |
| Acetone | 150 | 150 | 150 | 250 |
| BHT | 0.8 | 0.8 | 0.8 | 0.8 |
| NCO % prepolymer on solids | 4.9 | 4.8 | 5.2 | 4.6 |
| TEA | 10.7 | 14.5 | 14.5 | 14.5 |
| Water | 885 | 885 | 885 | 885 |
| EDA | 12.6 | 12.3 | 13.3 | 11.8 |

Note:
The amount of acetone used in Example 1 differs from amount used in Comp Ex A. However, since acetone is distilled off, the amount of acetone does not influence the performance of the coating composition.

TABLE 2

| Specifications | | | | | | | | | | | |
|---|---|---|---|---|---|---|---|---|---|---|---|
| | Ex. 1 | Comp. Ex. A | Ex. 2 | Comp. Ex B | Ex. 3 | Ex. 4 | Ex. 5 | Ex. 6 | Ex. 7 | Ex. 8 | |
| NCO/OH molar ratio prepolymer | 1.5 | 1.5 | 1.5 | 1.5 | 1.8 | 1.5 | 1.5 | 1.5 | 1.5 | 1.5 | |
| C═C theor on prepolymer solids [meq/g solids] | 1.0 | 1.0 | 1.0 | 1.0 | 3.7 | 1.0 | 1.0 | 1.4 | 1.0 | 1.0 | |
| Solids (%) | 28 | 32 | 33 | 33 | 35 | 34 | 30 | 32 | 36 | 32 | |
| pH | 7.7 | 7.9 | 7.1 | 7.5 | 7.1 | 7.1 | 8.2 | 7.8 | 7.1 | 6.9 | |
| Viscosity * | 97 | 50 | 17 | 18 | 30 | 26 | 410 | 185 | 37 | 135 | |
| Particle size (nm) | 98 | 32 | 53 | 63 | 78 | 62 | 167 | 43 | 63 | 99 | |
| MFFT (° C.) | 17 | 43 | 7 | 28 | <5 | 14 | <5 | <5 | 31 | 37 | |

| | Ex. 9 | Comp. Ex C | Comp. Ex. D | Comp. Ex. E |
|---|---|---|---|---|
| NCO/OH molar ratio prepolymer | 1.5 | 1.5 | 1.5 | 1.5 |
| C═C theor on prepolymer solids [meq/g solids] | 1.3 | 1.3 | 1.3 | 1.3 |
| Solids (%) | 33.1 | 35.3 | 33.8 | 34.9 |
| pH | 7.4 | 7.0 | 8.2 | 8.2 |
| Viscosity * | 23 | 24 | 18 | 35 |
| Particle size (nm) | 74 | 46 | 96 | 93 |
| MFFT (° C.) | 44 | 60 | 46 | 39 |

* A Brookfield viscosity at 25° C. (mPa · s)

Comparing Ex 9 with Comp Ex C and comparing Comp Ex D with Com Ex E shows that the additional use of HDI results in a MFFT reduction and that the MFFT reduction is much more pronounced when HDI is used in combination with H12MDI compared to when HDI is used in combination with IPDI.

To 30 g of the final dispersions of Examples 1-2 and Comparative Examples A and B different amounts of coalescent, Dowanol DPM (DDPM) or Agisyn 2836 were added in amounts of respectively 0.3 [1%], 0.6 [2%], 1.2 [4%] grams. The radiation curable binders according to the invention show a low minimal film formation temperature and coalescent demand is low as demonstrated in Table 3 & 4.

TABLE 3

| Sample | MFFT [° C.] [0% DDPM] | MFFT [° C.] [1% DDPM] | MFFT [° C.] [2% DDPM] | MFFT [° C.] [4% DDPM] |
|---|---|---|---|---|
| Ex. 1 | 17 | <5 | | |
| Comp. Ex. A | 43 | 37 | 27* | 22* |
| Ex. 2 | 7 | <5 | | |
| Comp. Ex. B | 28 | 26 | 25 | 20 |

Note:
*= BYK-346 (from BYK) added for good levelling

TABLE 4

| Sample | MFFT [° C.] | MFFT [° C.] [1% Agisyn 2836] | MFFT [° C.] [2% Agisyn 2836] | MFFT [° C.] [3% Agisyn 2836] | MFFT [° C.] [5% Agisyn 2836] | MFFT [° C.] [7% Agisyn 2836] |
|---|---|---|---|---|---|---|
| Ex. 1 | 17 | 16 | 9 | <5 | | |
| Comp. Ex. A | 43 | 43 | 37 | 33 | 22 | 19 |
| Ex. 2 | 7 | <5 | | | | |
| Comp. Ex. B | 28 | 30* | | 26* | 19* | 16** |

Note:
*= BYK-346 (from BYK) added for good levelling

The radiation curable binders prepared in Examples 1-9 and Comparative Examples A-E were formulated with 2% Irgacure 500 (relative to dispersion), available from BASF. If required BYK-346 was added to improve substrate wetting. The formulated compositions (see Table 5 for amounts of Dowanol DPM) were cast onto a Leneta test chart using a wire rod at a wet film thickness of 125 micron. Coalescent was added to the dispersion in such an amount that a continuous defect-free film could be formed at the applied temperature conditions in order to be able to determine the stain resistances of the cured coating. The cast films were then allowed to dry at room temperature for 10 minutes, followed by 20 minutes at 50° C. Then the films were cured by UV radiation using a Mercury lamp [500 mJ/cm$^2$, 80 W]. The panels were stored for 4-6 hours at room temperature before aging for 16 hours at 50° C. in an oven with air flow (=1.2 m/s). The coatings were allowed to cool to room temperature for 1 hour. The stain resistance of the coated cards towards the following stains were then assessed: ammonia, water, red wine, ethanol (48%), coffee, tea and mustard. In all cases, a spot (1 cm$^2$) of the respective stain was placed on the coating and covered with a piece of filter paper and a watch glass. After the test periods, the spot was gently wiped off with a tissue and the film was assessed for its integrity. This was rated between 0 to 5, where:

Grade 5—No change; Test area indistinguishable from adjacent surrounding area.

Grade 4—Minor change; Test area distinguishable from adjacent surrounding area, only when the light source is mirrored on the test surface and is reflected towards the observer's eye, e. g. discoloration, change in gloss and color. No change in the surface structure, e.g. swelling, fiber raising, cracking, blistering.

Grade 3—Moderate change; Test area distinguishable from adjacent surrounding area, visible in several viewing directions, e. g. discoloration, change in gloss and colour. No change in the surface structure, e.g. swelling, fibre raising, cracking, blistering.

Grade 2—Significant change; Test area clearly distinguishable from adjacent surrounding area, visible in several viewing directions, e. g. discoloration, change in gloss and colour.

Grade 1—Strong change; Test area clearly distinguishable from adjacent surrounding area, visible in several viewing directions, e. g. discoloration, change in gloss and colour, and/or the surface material being totally or partially removed.

Stain resistances of the coatings of the Examples versus of the Comparative Examples clearly demonstrate that with low amount of coalescent sufficient and mostly similar level of stain resistances can be achieved. Lowering the amount of Dowanol DPM of Comparative Example A-E resulted in that no continuous, defect-free film could be obtained and hence stain resistances of the coating were very poor.

TABLE 5

Formulation and resulting stain resistances

| | | Ex. 1 | Comp. A | Ex. 2 | Comp. B | Ex. 3 | Ex. 4 | Ex. 5 |
|---|---|---|---|---|---|---|---|---|
| WFT | μm | 125 | 125 | 125 | 125 | 125 | 125 | 125 |
| Dispersion | g | 30 | 30 | 30 | 30 | 30 | 30 | 30 |
| Irg 500 | g | 0.6 | 0.6 | 0.6 | 0.6 | 0.6 | 0.6 | 0.6 |
| Water | g | 0 | 2 | 3 | 3 | 0 | 0 | 0 |
| Dowanol DPM | g | 0.3 | 1.5 | 0.3 | 0.6 | 0 | 1.2 | 0 |
| BYK 346 | g | 0 | 0 | 0.06 | 0.08 | 0 | 0 | 0 |
| Solid content formulation | % | 30 | 30 | 30 | 30 | 35 | 33 | 29 |
| Stains | | | | | | | | |
| Ammonia | 2 min | 5 | 5 | 5 | 5 | 5 | 5 | 5 |
| Ethanol 48% | 1 h | 5 | 5 | 5 | 5 | 5 | 5 | 5 |

TABLE 5-continued

Formulation and resulting stain resistances

| | | | | | | | | |
|---|---|---|---|---|---|---|---|---|
| Red Wine | 6 h | 4 | 4 | 3 | 4 | 5 | 5 | 5 |
| Mustard | 6 h | 1 | 3 | 1 | 2 | 3 | 3 | 3 |
| Coffee | 1 h | 5 | 5 | 5 | 5 | 5 | 5 | 5 |
| Coffee | 16 h | 4 | 4 | 3 | 3 | 5 | 3-4 | 3-4 |
| Water | 16 h | 5 | 5 | 5 | 5 | 5 | 5 | 5 |
| Water | 24 h | 5 | 5 | 5 | 5 | 5 | 5 | 5 |
| Tea | 16 h | 5 | 5 | 5 | 5 | 5 | 5 | 5 |

| | | Ex. 6 | Ex. 7 | Ex. 8 | Ex. 9 | Comp. C | Comp. D | Comp. E |
|---|---|---|---|---|---|---|---|---|
| WFT | μm | 125 | 125 | 125 | 125 | 125 | 125 | 125 |
| Dispersion | g | 30 | 30 | 30 | 30 | 30 | 30 | 30 |
| Irg 500 | g | 0.6 | 0.6 | 0.6 | 0.6 | 0.6 | 0.6 | 0.6 |
| Water | g | 0 | 4 | 0 | 0 | 0 | 0 | 0 |
| Dowanol DPM | g | 0.6 | 1.2 | 1.5 | 2.7 | 3.0 | 2.1 | 2.1 |
| BYK 346 | g | 0 | 0.08 | 0 | 0.2 | 0.2 | 0.16 | 0.04 |
| Solid content formulation | % | 30 | 31 | 31 | 30 | 31 | 31 | 32 |
| Stains | | | | | | | | |
| Ammonia | 2 min | 5 | 5 | 5 | 5 | 5 | 5 | 5 |
| Ethanol 48% | 1 h | 5 | 5 | 5 | 5 | 5 | 5 | 5 |
| Red Wine | 6 h | 5 | 5 | 5 | 5 | 5 | 5 | 5 |
| Mustard | 6 h | 2 | 4 | 4 | 5 | 5 | 3 | 2 |
| Coffee | 1 h | 5 | 5 | 5 | 5 | 5 | 5 | 5 |
| Coffee | 16 h | 3 | 5 | 3-4 | 5 | 5 | 4 | 3 |
| Water | 16 h | 5 | 5 | 5 | 5 | 5 | 5 | 5 |
| Water | 24 h | 5 | 5 | 5 | 5 | 5 | 5 | 5 |
| Tea | 16 h | 5 | 5 | 5 | 5 | 5 | 5 | 5 |

The results as shown in Table 2 and 5 show that the use of H12MDI in combination with HDI results in that a MFFT comparable to when IPDI is used can be obtained (i.e. 44° C. vs 46° C., see Table 3, Ex. 9 and Comp Ex D), while the stain resistances (ammonia, ethanol, red wine, water and tea) of a coating obtained with a composition comprising a polyurethane comprising H12MDI and HDI as building blocks compared to a coating obtained with a composition comprising a polyurethane comprising IPDI as building block are at the same level and the resistances against mustard and prolonged exposure to coffee (16 h) are even improved (see Table 5, Ex. 9 and Comp Ex D).

The invention claimed is:

1. A radiation-curable aqueous coating composition comprising:
   a polyurethane A and optionally a radiation-curable diluent, wherein the polyurethane A comprises as building blocks at least the following components (a), (b) and (c):
   (a) a polyisocyanate containing at least two cyclic groups,
   (b) a non-cyclic aliphatic diisocyanate which includes a non-cyclic aliphatic group connecting two isocyanate groups having from 4 to 36 carbon atoms, and
   (c) a component containing an isocyanate-reactive group, wherein
   the summed amount of components (a) and (b) is 10 to 60 wt. %, relative to the total weight amount of components used to prepare the polyurethane A; and wherein
   components (a) and (b) are present in a weight ratio of the component (a) to the component (b) is in a range from 75:25 to 95:5; and wherein
   the polyurethane A has an acid value which is in a range from 4 to 60 mg KOH/g polyurethane A, and wherein the aqueous coating composition has an ethylenically unsaturated bond concentration in a range from 0.5 to 6 milliequivalents per gram of the polyurethane A and the radiation-curable diluent.

2. The aqueous coating composition according to claim 1, wherein the weight ratio of the components (a) to (b) is from 75:25 to 90:10.

3. The aqueous coating composition according to claim 1, wherein the component (a) is a polyisocyanate containing at least two cycloaliphatic groups.

4. The aqueous coating composition according to claim 1, wherein the component (a) is dicyclohexylmethane diisocyanate.

5. The aqueous coating composition according to claim 1, wherein the component (b) is a non-cyclic aliphatic C4-C9 diisocyanate.

6. The aqueous coating composition according to claim 1, wherein component (b) is 1,6-diisocyanatohexane.

7. The aqueous coating composition according to claim 1, wherein the ethylenically unsaturated bond concentration of the coating composition is introduced in the coating composition by the presence of (meth)acryloyl groups in the polyurethane (A) and/or the presence of the radiation-curable diluent.

8. The aqueous coating composition according to claim 1, wherein the component (c) comprises at least one isocyanate-reactive component containing at least one (meth)acryloyl group per molecule.

9. The aqueous coating composition according to claim 1, wherein the polyurethane A is prepared by forming a neutralized isocyanate-terminated polyurethane pre-polymer which is dispersed in water and thereafter subsequently chain-extended with a chain-extending compound selected from the group consisting of hydrazine, a primary diamine, a secondary diamine, a compound containing a primary amino group and a secondary amino group, and mixtures thereof.

10. The aqueous coating composition according to claim 1, wherein the coating composition has a minimum film formation temperature of lower than 35° C. in the substantial absence of coalescent.

11. The aqueous coating composition according to claim 1, wherein the coating composition has a minimum film formation temperature of lower than 35° C. in the substantial absence of radiation-curable diluent.

12. The aqueous coating composition according to claim 1, wherein the aqueous coating composition contains 1-methyl-2-pyrrolidinone in an amount less than 3 wt. % by weight of solids content of the coating composition.

13. The aqueous coating composition according to claim 1, wherein the coating composition contains tin in amount of at most 2 ppm.

14. The aqueous coating composition according to claim 1, wherein the coating composition contains tertiary amines in amount of at most 1.5 wt. %.

15. The aqueous coating composition according to claim 1, wherein the polyurethane A is present in the aqueous coating composition in an amount of from 20 to 55 wt. % relative to the total weight of aqueous coating composition.

16. The aqueous coating composition according claim 1 wherein the aqueous coating composition comprises a photo-initiator.

17. The aqueous coating composition according to claim 5, wherein the component (b) is a C4-C8 diisocyanate.

18. The aqueous coating composition according to claim 1, wherein the component (c) comprises:
   at least one isocyanate-reactive component containing at least one (meth)acryloyl group per molecule; and
   at least one isocyanate-reactive component containing ionic and/or potentially ionic water-dispersing groups; and wherein
   component (c) further optionally comprises an isocyanate-reactive component different from any other component (c) and is selected from the group consisting of polyester(amide) polyols, polyether polyols, polycarbonate polyols and any mixture thereof.

19. A process for preparing the aqueous coating composition according to claim 1 comprising the following steps:
   I. preparing an isocyanate-terminated polyurethane pre-polymer optionally in the presence of a diluent by reacting at least the following components (a), (b), (c):
      (a) a polyisocyanate containing at least two cyclic groups,
      (b) a non-cyclic aliphatic diisocyanate which includes a non-cyclic aliphatic group connecting two isocyanate groups having from 4 to 36 carbon atoms, and
      (c) a component containing at least one isocyanate-reactive group comprising:
         (c)(i) an isocyanate-reactive component containing ionic and/or potentially ionic water-dispersing groups, and/or
         (c)(ii) an isocyanate-reactive component containing at least one (meth)acryloyl group per molecule, and/or
         (c)(iii) an isocyanate-reactive component other than the components by (c)(i) and (c)(ii); wherein
      the summed amount of the components (a) and (b) is 10 to 60 wt. %, relative to the total weight amount of components used to prepare the polyurethane A; and wherein
      the components (a) and (b) are present in a weight ratio of the component (a) to the component (b) is in the range from 75:25 to 95:5;
   II. either blending the isocyanate-terminated polyurethane pre-polymer with an aqueous phase comprising neutralizing agent and optionally further comprising a chain extending compound or either neutralizing the isocyanate-terminated polyurethane pre-polymer by adding neutralizing agent to the isocyanate-terminated polyurethane pre-polymer and subsequently (i) adding the neutralized isocyanate-terminated polyurethane prepolymer to water optionally comprising a further chain extending compound or (ii) adding water optionally comprising a further chain extending compound to the neutralized isocyanate-terminated polyurethane prepolymer; and
   III. feeding to a reactor, at the start of the reaction to prepare the isocyanate-terminated polyurethane pre-polymer, either
      (A) components (a) and (b) and at least one of the components (c)(i), (c)(ii) and (c)(iii),
      (B) component (a) and at least two of the components (b), (c)(i), (c)(ii) and (c)(iii) or
      (C) component (b) and at least two of the components (a), (c)(i), (c)(ii) and (c)(iii); and wherein
   the preparation of the polyurethane A is effected in the presence of <3 wt. % of 1-methyl-2-pyrrolidone by weight of the polyurethane A.

20. The process according to claim 19, wherein the weight ratio of the components (a) to (b) is from 75:25 to 90:10.

21. The process according to claim 19, wherein the chain-extending of the isocyanate-terminated polyurethane pre-polymer is effected with a compound selected from the group consisting of hydrazine, a primary diamine, a secondary diamine, a compound containing a primary amino group and a secondary amino group, and mixtures thereof.

22. A coated substrate comprising a substrate, and a coating on the substrate, wherein the coating comprises the aqueous coating composition according to claim 1.

23. The coated substrate according to claim 22, wherein the aqueous coating composition is cured by physically drying and curing by radiation to obtain a cured coating on the substrate.

24. The substrate according to claim 22, wherein the substrate is selected from the group consisting of wood, metal, plastic, linoleum, concrete, glass, packaging film and combinations thereof.

25. The substrate according to claim 22, wherein the substrate is selected from the group consisting of wood, PVC, linoleum and combinations thereof.

26. A method for coating a substrate selected from the group consisting of wood, metal, plastic, linoleum, concrete, glass, packaging film and combinations thereof; where the method comprises:
   (i) applying the aqueous coating composition according to claim 1 to the substrate; and
   (ii) physically drying and curing by radiation the aqueous coating composition to obtain a cured coating on the substrate.

* * * * *